Figure 1:
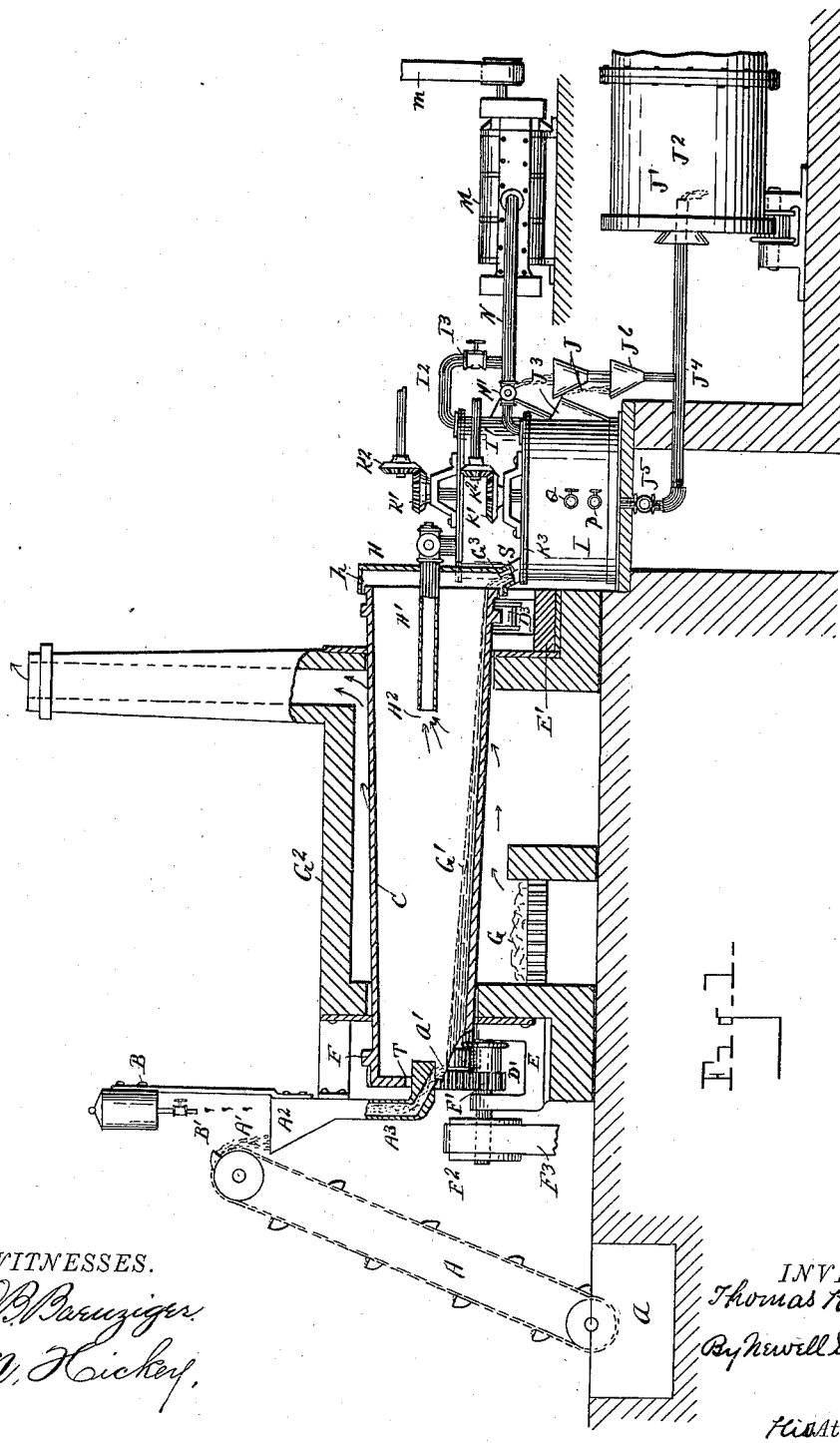

No. 741,338. PATENTED OCT. 13, 1903.
T. H. HICKS.
ORE DEARSENICATING AND AMALGAMATING APPARATUS.
APPLICATION FILED MAY 14, 1900.
NO MODEL. 4 SHEETS—SHEET 1.

WITNESSES.
INVENTOR,
Thomas H. Hicks
By Newell S. Wright
His Attorney

No. 741,338. PATENTED OCT. 13, 1903.
T. H. HICKS.
ORE DEARSENICATING AND AMALGAMATING APPARATUS.
APPLICATION FILED MAY 14, 1900.
NO MODEL. 4 SHEETS—SHEET 2.

No. 741,338. PATENTED OCT. 13, 1903.
T. H. HICKS.
ORE DEARSENICATING AND AMALGAMATING APPARATUS.
APPLICATION FILED MAY 14, 1900.
NO MODEL. 4 SHEETS—SHEET 3.
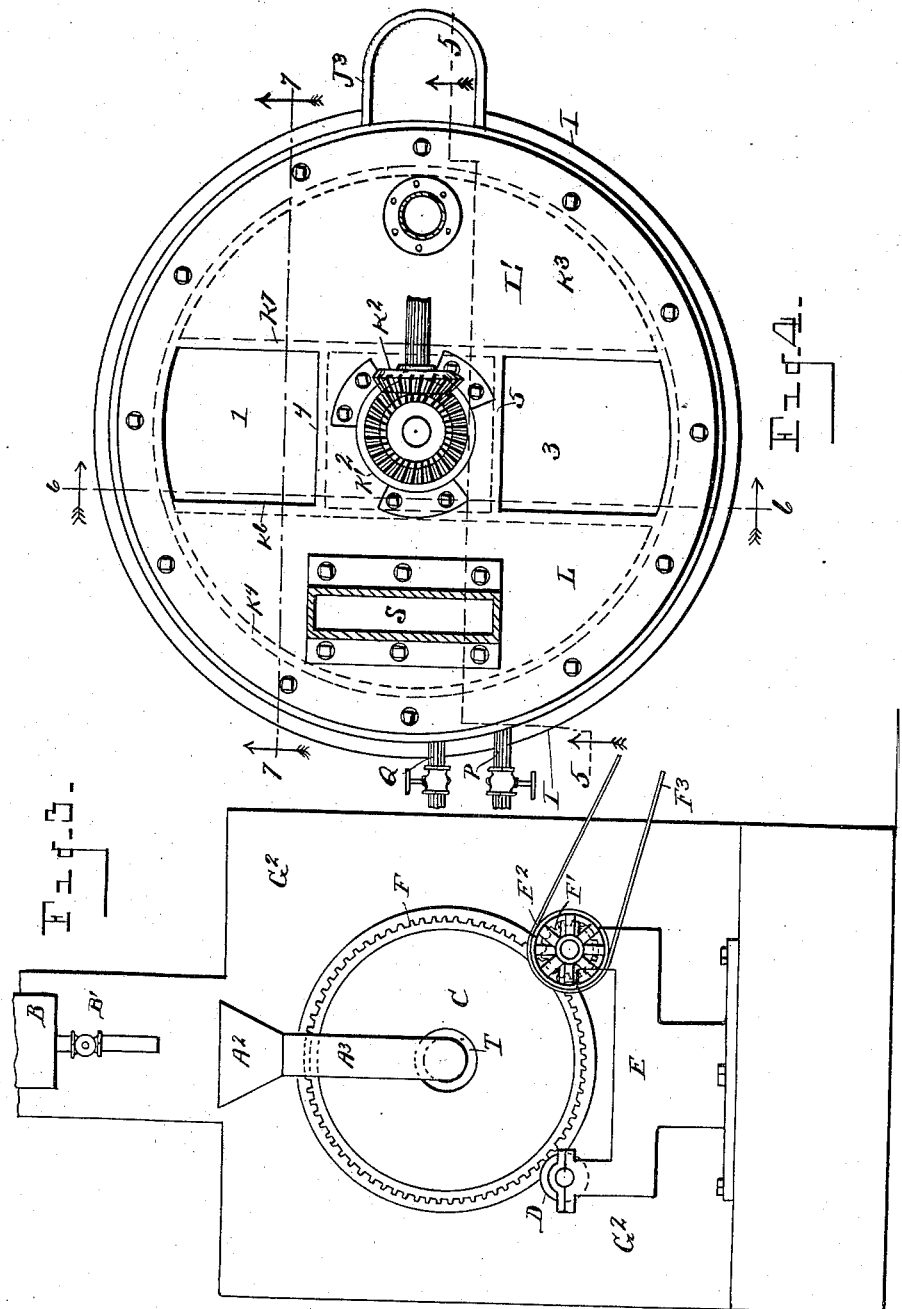
WITNESSES. INVENTOR.
Thomas H. Hicks
By Newell S. Wright
His Attorney

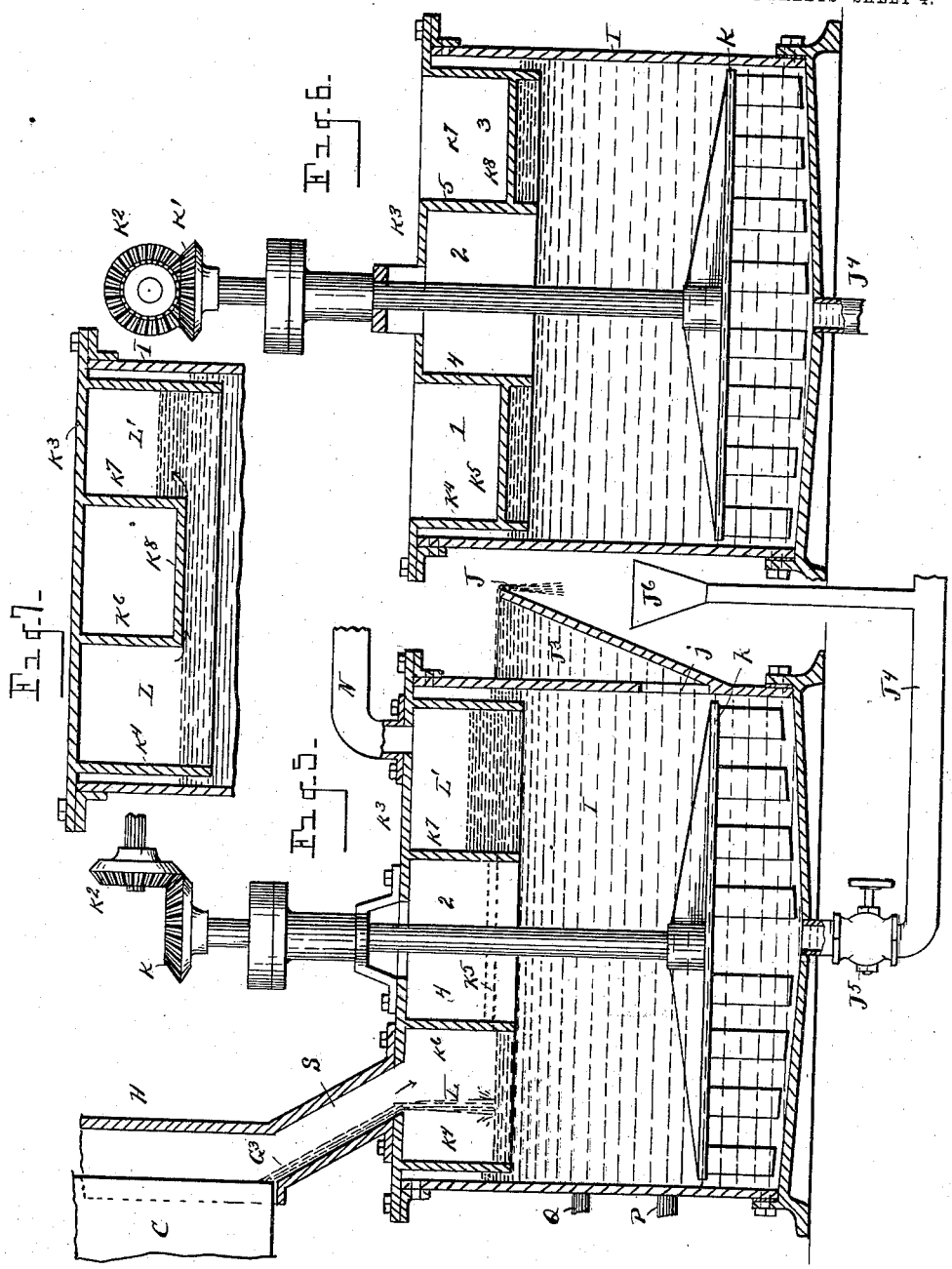

No. 741,338. Patented October 13, 1903.

UNITED STATES PATENT OFFICE.

THOMAS H. HICKS, OF FORT WAYNE, INDIANA, ASSIGNOR TO THE HICKS GOLD AND SILVER EXTRACTION COMPANY, A CORPORATION OF GEORGIA.

ORE DEARSENICATING AND AMALGAMATING APPARATUS.

SPECIFICATION forming part of Letters Patent No. 741,338, dated October 13, 1903.

Application filed May 14, 1900. Serial No. 16,567. (No model.)

*To all whom it may concern:*

Be it known that I, THOMAS H. HICKS, a subject of the Queen of Great Britain, residing at Fort Wayne, county of Allen, State of Indiana, have invented a certain new and useful Improvement in Ore Dearsenicating and Amalgamating Apparatus; and I declare the following to be a full, clear, and exact description of the invention, such as will enable others skilled in the art to which it appertains to make and use the same, reference being had to the accompanying drawings, which form a part of this specification.

This invention relates to new and useful improvements in an ore dearsenicating and amalgamating apparatus to be used for subjecting pulverized gold, silver, copper, and arsenical ores to the action of hot mercury-vapor for the purpose of preparing their contained minerals to be more easily collected by further amalgamation in suitable amalgamating or collecting tanks. The apparatus is adapted also to be used for desulfurizing ores when necessary and also for saving all rising mercury-vapors used in treating the ore and at the same time collect and save any arsenic contained in the ore which becomes driven off by heat during treatment of the ores. The apparatus is also adapted at the same time to collect, prepare, mix with water, heat, and deliver the mercury-treated and dearsenicated ore-pulp in a suitable condition for further amalgamation and collection in tanks where the values become extracted from the ores thus treated.

My invention therefore embodies the combination of varied apparatus to accomplish its desired end and the means of preparing ores ready to have their values extracted by final amalgamation in suitable apparatus.

My invention embraces a system for ore treatment whereby the treatment becomes continuous in its operation—*i. e.*, whereby the pulverized ore undergoing treatment can be caused to flow in and out of the apparatus automatically at the same time, so as to constitute what is well known by those skilled in this art as a "continuous" process for ore treatment.

The following specification clearly sets forth the nature of my present invention, and the drawings hereto annexed clearly illustrate all essential features of the same.

To these ends my invention consists of the construction, combination, and arrangement of devices and appliances hereinafter described and claimed, and illustrated in the accompanying drawings, forming a part of this specification, in which—

Figure 2:
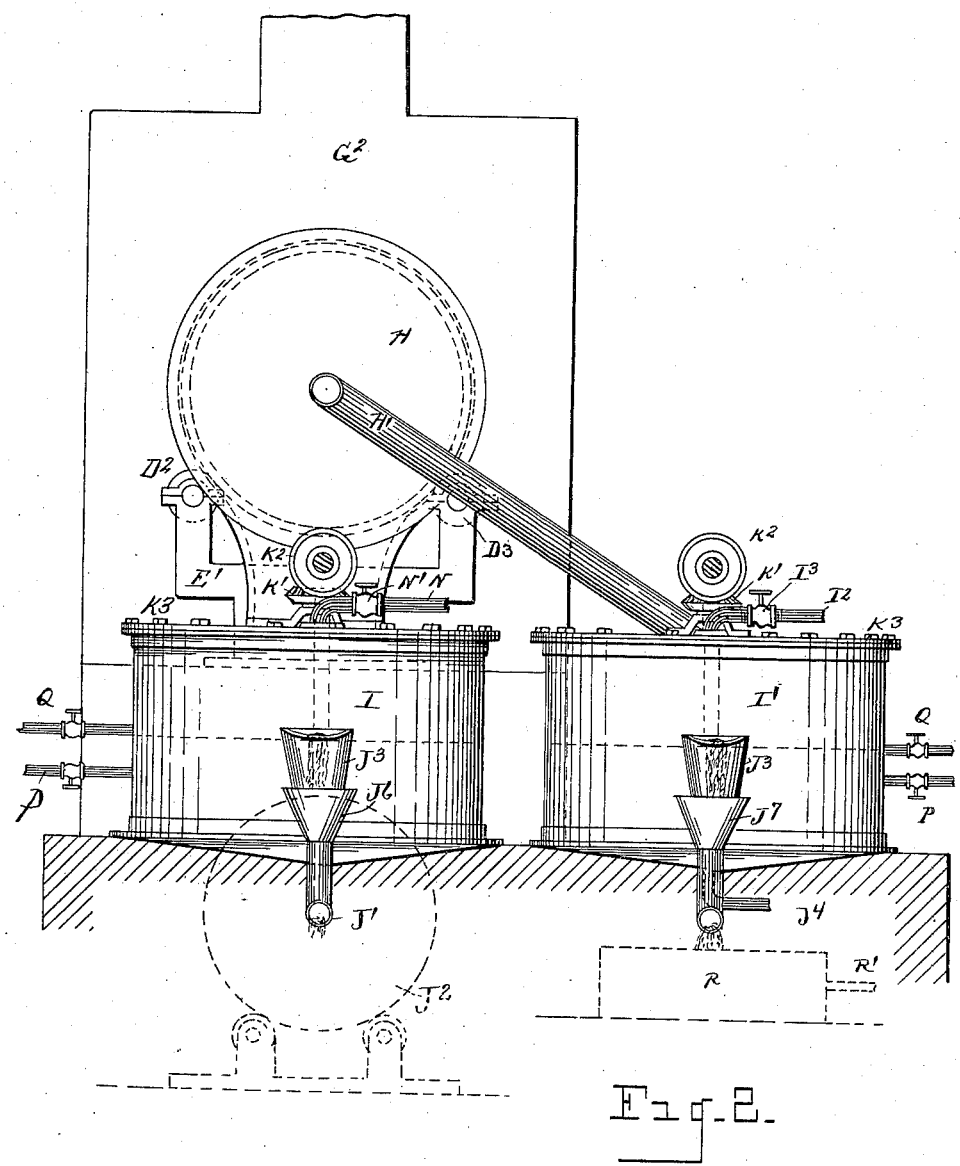

Figure 1 is a view, partly in side elevation and partly in vertical section, showing features of my invention. Fig. 2 is an end elevation showing parts broken away. Fig. 3 is an end elevation from the opposite extremity of the rotatable retort. Fig. 4 is a plan view of an ore collecting and mixing tank. Fig. 5 is a vertical section on the line 5 5, Fig. 4. Fig. 6 is a vertical section on the line 6 6, Fig. 4. Fig. 7 is a partial vertical section on the line 7 7, Fig. 4.

The various parts of the combined apparatus illustrated in the drawings are lettered and described as follows, like letters indicating like parts:

A represents a pulverized-ore conveyer shown delivering its ore (indicated at A') into a hopper $A^2$. The ore-conveyer A may be of any suitable construction.

B indicates any suitable mercury apparatus for delivering a suitable quantity of mercury to become mixed with the ore.

B' indicates mercury dropping with the ore into the hopper $A^2$. The hopper is suitably arranged to convey the ore and mercury into a rotatable retort C. This retort is mounted on wheel or roller bearings D D' $D^2$ $D^3$, D and D' being arranged at the front end of the retort and $D^2$ $D^3$ at the back end. E and E' are supporting-bearings for said roller-bearings.

F is a gear attached to the retort C and meshing with a gear F'.

$F^2$ is a pulley mounted on the shaft of the gear F' and is driven by a belt $F^3$, thereby causing the retort C to rotate upon its bearings.

G indicates a furnace for heating the retort C.

G' indicates pulverized ore moving through the retort by the rotating action of the latter.

$G^2$ indicates the brick structure of the furnace and is arranged to incase the heated part of the retort C.

H is a stationary end casing of the retort, inclosing the outlet extremity of the retort and spaced therefrom, leaving a sufficient space between the casing H and the retort to allow the retort to be rotated without contacting with the end H.

H' is a pipe secured to the end H for drawing off arsenical and mercury fumes rising from the ore G' as the latter becomes sufficiently heated in the retort. The arrows $H^2$ indicate arsenical and mercury fumes rising to pass off through the pipe H'.

$G^3$ indicates the pulverized ore as it leaves the retort after it has been dearsenicated (or had its arsenic driven off) and sufficiently acted upon by the mercury.

An ore collecting and mixing tank is indicated at I, into which the ore is received as it drops from the retort and in which the ore is mixed with sufficient water to form a flowable pulp, as indicated at J and J', where it is shown to be leaving the mixer I and conveyed to an amalgamator $J^2$.

$J^3$ is an overflow-pipe attached to the tank I, ore-pulp being indicated flowing therefrom into a funnel-shaped pipe $J^6$, leading into a pipe $J^4$, said pipe provided with a cock $J^5$ to convey the ore-pulp to the amalgamator $J^2$.

K is an agitator and ore-mixer arranged in the tank I, which may be rotated by any suitable power—as, for example, by the gears K' and $K^2$, which mesh with each other—and driven from any suitable source of power.

$K^3$ is a cover secured by bolts to the top of the tank I. The cover $K^3$ has an annular projecting lip or flange $K^4$, preferably cast integral therewith. The space inclosed by said lip or flange $K^4$ is divided into two equal parts L and L' by downwardly-projecting partitions $K^6$ and $K^7$, joined to opposite sides of the flange $K^4$. The space included within the partitions $K^6$ and $K^7$ is divided into three parts or chambers (marked 1 2 3) by transverse partitions 4 and 5. The chambers 1 and 3 are closed at their lower ends by floors $K^5$ and $K^8$, while the chamber 2 is without flooring. The four sides of the central chamber project a few inches below the floors $K^5$ and $K^8$, as shown in Figs. 5 and 6.

M denotes a suction device, which may be of any desired construction and which may be driven by any suitable source of power, as by a belt $m$, said device being connected by a pipe N with the tank I, said pipe being provided with a controlling-valve N'.

Communicating with the tank I is a water-supply pipe P and a steam supply pipe Q for heating the contents of the tank I.

The retort C is made tapering, the same being made gradually larger from the inlet toward the outlet ends thereof, so that its lower surface will be inclined downward, so as to cause the ore to move through the retort from its inlet to its outlet end as the retort is rotated. The hopper $A^2$ discharges into the forward end of the retort C, as shown at $a'$.

The amalgamator $J^2$ may be of any desired construction—as, for example, it may be constructed in a manner similar to an amalgamating-tank forming the subject-matter of a separate application, filed by me in the United States Patent Office March 23, 1900, Serial No. 9,868.

The tank I' is of similar construction to the tank I and is used for the purpose of condensing and saving arsenical and mercury vapors when ores of that kind are being treated. Into the tank I' leads the pipe $H^2$, through which the arsenical fumes are carried into the tank I', where they are condensed by passing through water in the tank I'. A pipe $I^2$ leads from the tank I' into the pipe N, said pipe containing a controlling-valve $I^3$. The construction of the tank I' being, as already noted, analagous to that of the tank I needs no further description. Instead, however, of discharging any ore from the tank I' mercury and condensed arsenic are recovered and discharged into a reservoir R. (Indicated in dotted lines in Fig. 2.) The pipe $J^7$ connected with the tank I' is discharged into said reservoir. The tank R is provided with an overflow-pipe (indicated at R') for the purpose of allowing the water to separate from the arsenic, the arsenic being deposited in the base of said reservoir.

It will be observed that in the tanks I I' the bottom slopes toward the center, as shown in Figs. 5 and 6, to allow the contents of the tank to be more readily discharged from the pipe $J^4$. In the case of the tank I' any condensed mercury collected in the tank I' will be drawn off through the pipe $J^4$. While the construction is the same, it will be understood that the tanks are used for different purposes, the ore being drawn off from the tank I into the amalgamator $J^2$; but in the tank I' mercury is drawn off through the pipe $J^4$ into any suitable receptacle, (not shown,) and therefore said pipe $J^4$ leading from the tank I' is not led to an amalgamator.

The ore is discharged from the outlet in the retort C into the tank I through a discharge pipe or channel S, where it becomes suitably mixed with the water contained in the tank I.

The operation of treating the ore in my improved apparatus is as follows: Ore after having been pulverized is carried by the conveyer A from an ore-reservoir at its base (indicated at $a$) and discharged into the hopper $A^2$. If it be a rebellious ore requiring a preliminary treatment by heated mercury, a sufficient quantity of mercury may in that case be at the same time discharged into the hopper $A^2$, where it becomes mixed with the ore as the mercury and ore by gravity fall into the inlet end of the retort C, said retort being put into rotary motion, so as to further mix the ore and mercury together, the ore and mercury being thereby caused to move through the retort. The ore and mercury will readily move from the inlet end of the retort to the discharge end thereof on account of the tapering construction of the retort, already described, together with the rotary action of the retort. The retort having been sufficiently heated by the furnace G causes the ore and mercury to become sufficiently heated together, the heat causing the mercury to be evaporated and driven off from the ore. At the same time the ore moves along by the rotary action of the retort and is discharged into the tank I through the channel S, as already described. If an ore is being treated which contains no detrimental products to interfere with the treatment of the ore in the tank I, then in that case the mercury-vapor is drawn from the channel S and through the tank I by the suction device M.

The front end of the retort is provided with an opening (indicated in Fig. 3 at T) through which the lower end of the pipe $A^3$, leading from the hopper $A^2$, is inserted, the front of the retort being spaced from the lower end of the pipe $A^3$, permitting air to enter into the retort. Air is also permitted to enter the channel S through the space (indicated at $h$) between the end H and the adjacent extremity of the retort. Air, it will be seen, is drawn into the retort and into the channel S through the openings T and $h$ by the suction device. The object of drawing in the air through the openings T and $h$ is for two purposes—first, to prevent any mercury or other fumes from escaping from the retort during its rotation or treatment of the ore, and in case an ore is being treated requiring the presence of air to thereby supply the ore with the necessary amount of air required in the treatment, as in the case of an arsenical ore, where it requires oxygen to form an oxid of arsenic, which thereby causes the arsenic to be more easily extracted from the ore in that form or, in the case of a sulfid ore, to destroy the sulfur by its union with a suitable amount of oxygen.

The overflow-pipe $J^3$ communicates with the tank I at its base, as indicated at $j$. The tank I is filled with water to about the level of the upper or outlet end of the overflow-pipe $J^3$. This causes the chamber 2 to be sealed by water at the base thereof. Suction having been applied causes water to rise in the chamber L' and to sink proportionately in the chamber L. This permits the air to be drawn through the chamber L under the floors of the partitions $K^6$ and $K^7$ into and through the chamber L', the air being drawn off through the pipe N by the suction device and discharged therefrom. This air suction draws all the fumes into the water, the condensible fumes, such as mercury, being condensed in the water and the non-condensible fumes being drawn through the water and discharged from the tank through the pipe N. The ore and mercury are thereby collected by the water in the tank I during the passage of the air-current therethrough, as described. The agitator being set in motion prevents the ore from settling. The water constantly flowing into the tank I through the pipe P causes the ore to flow through the pipe $J^4$, the flow of ore through the pipe $J^4$ being governed by the valve $J^5$. The main part of the ore and any collected mercury will be carried to the amalgamator $J^2$ through the pipe $J^4$, the apparatus being regulated to permit just enough of an overflow through the pipe $J^3$ to indicate that the water in the tank I is high enough to keep the chamber 2 sealed. If ores are being treated which contain no arsenic, the tank I may be used alone without the tank I', the tank I' being cut off from operation by means of the valve $I^3$ in the pipe $I^2$. In case, however, that ores are being treated containing arsenic the valve $I^3$ is open, and the operation in this case is as follows: The fumes of arsenic expelled by heat in the retort C being properly oxidized are drawn off by the suction device through the pipe H' into the tank I, where said fumes are condensed by the water in said tank in a manner analogous to the collection of the ore in the tank I. In case the mercury has been used in the treatment of ore in the retort C then the mercury and arsenical fumes are drawn off together through the pipe H' into the tank I', where the mercury is condensed by the water in the tank I' and falls to the bottom of said tank, from which it can be drawn off through the pipe $J^4$, as already described. At the same time the agitator in the tank I' is stirred, permitting the arsenic to be discharged through the overflow-pipe $J^3$ into the tank R, as hereinbefore stated, so that the water collects all of the arsenic without the escape of any fumes, which always occurs when collected by chimneys in the ordinary way. The pipes S and N preferably communicate with the corresponding tank on opposite sides thereof.

I desire to call special attention to the application of my present invention in the treatment of arsenical ores, whereby the arsenic is separated and collected by water. Heretofore in the treatment of arsenical ores the arsenical fumes have been driven off by heating the ores and collecting the fumes in chimneys having compartments. The oxid of arsenic thus deposited in the compartments of the chimneys is collected therefrom by being scraped off from the walls of the compartments. Recovery of arsenic in this way causes the dry oxid to fly off into the air, so that it is impossible to collect the arsenic in this way without the arsenic being inhaled by the workmen recovering it from the chimney; but by my present invention the arsenic is collected and saved by water, which prevents the possibility of any arsenical dust to injure the health of the workmen. Thus it may be seen that one of the special features of my invention is the recovery of the arsenical oxid by the use of water.

It will be understood that the object of adding mercury to the pulverized ore and heating the two together is to cause the particles of metal contained in the ore to become amalgamated with the mercury. This is especially necessary where very rebellious ores are treated. It will thus be seen that ore may be fed continuously into one end of the retort with mercury mixed therewith, the ore and mercury being also continuously discharged from the opposite end of the retort, while at the same time the vaporized mercury may be separated from the ore in the retort and collected in a separate tank.

What I claim as my invention is—

1. In combination, a retort adapted to be rotated and having an open outlet end; a stationary end casing having a loosely-fitting union with the open outlet end of said retort; and a suction device arranged to draw air into said retort through said loosely-fitting union at the outlet end of said retort to prevent fumes from escaping from the retort.

2. In combination, a retort adapted to be rotated and having an open outlet end; a stationary end casing having a loosely-fitting union with the open outlet end of said retort; an ore-collecting tank adapted to contain water and receive discharged ore contents from said retort; a cover arranged to seal the top of said tank to prevent escape of fumes therefrom; downwardly-projecting partitions depending from the cover of the tank and arranged to dip into the water contained in the tank; and a suction device attached to said tank and arranged to draw air and fumes from said retort under said partitions and from said tank.

3. In combination, a retort adapted to be rotated and having an open outlet end; a stationary end casing having a loosely-fitting union with the open end of said retort; a tank arranged to receive the discharged ore contents from said retort; a channel arranged for the passage of ore from the stationary end of the retort to said tank; a second tank, and a pipe leading from the interior of said retort and arranged to convey fumes from the retort to the second tank; and means to produce a partial vacuum in said retort and in both said two tanks.

4. In combination, a retort adapted to contain ore; a loosely-fitting end casing arranged to cover the discharge end of said retort; an ore-receiving tank; a conduit-channel arranged to convey ore from said retort to said tank; means to cause the ore to fall by gravity from said retort through said channel and into said tank; and means to create a partial vacuum in said retort.

5. In combination, a retort having an open end adapted to be rotated and to receive ore and mercury, and having its internal diameter at its discharge end greater than the diameter of its inlet end to cause its contained ore to move toward the discharge end during rotation of the retort; means to rotate the retort; a stationary end casing loosely sealing said open end of the retort; an ore-collecting tank arranged to receive ore discharged from said retort; means arranged to cause the ore in said retort to fall by gravity from said retort into said tanks; and means to create a partial vacuum in said retort.

6. In combination, a retort having an open end; a stationary end casing loosely sealing said open end; an ore-collecting tank adapted to contain water, an agitator arranged in said tank; two outlets arranged to discharge the contents from said tank; a channel leading from said stationary end casing to said tank for conveying ore from the retort to the tank; means arranged to draw vapors from said retort into and through the water in said tank; and means to create a partial vacuum in said retort.

7. In combination, a retort to heat ore, a tank to contain water and receive the heated ore from the retort, an agitator to prevent the ore from settling in said tank, an amalgamator to receive the mixed ore and water from said tank, and a suction device to produce a partial vacuum in said retort.

8. In combination, a retort to heat ore, means to admit air into the retort and thereby prevent the escape of vapors, a tank to contain water, a division-wall in said tank to extend down into the water and dividing the upper part of said tank into two compartments, one of said compartments arranged to receive the air and ore contents of said retort, and the other of said compartments provided with a suction device, whereby the air is drawn out of the first-named compartment into the second, thereby separating the air from the ore.

9. In apparatus for treating ores, a collecting-tank into which the ore is fed, means for supplying water to said tank, a cover for said tank provided with an annular flange projecting downward into said tank, the space inclosed by said flange divided into two compartments, through one of which compartments the ore is fed into the tank, a suction-pipe leading from the other of said compartments, and means for applying suction through said pipe, said compartments sealed at the base thereof by the water in said tank.

10. In apparatus for treating ores, a collecting-tank into which the ore is fed, means for supplying water to said tank, a rotatable agitator in said tank, a cover for said tank provided with an annular flange projecting downward into said tank, the space inclosed by said flange divided into two compartments, through one of which compartments the ore is fed into the tank, a suction-pipe leading from the other of said compartments, and means for applying suction through said pipe, said compartments sealed at the base thereof by the water in said tank.

In testimony whereof I sign this specification in the presence of two witnesses.

THOMAS H. HICKS.

Witnesses:
N. S. WRIGHT,
M. HICKEY.